United States Patent
Noto et al.

(10) Patent No.: US 11,130,489 B2
(45) Date of Patent: Sep. 28, 2021

(54) DRIVING MODE SWITCHING DEVICE

(71) Applicant: DENSO CORPORATION, Kariya (JP)

(72) Inventors: Noriyasu Noto, Kariya (JP); Yasuhiko Mukai, Kariya (JP); Hisaya Akatsuka, Kariya (JP); Daisuke Tokumochi, Kariya (JP)

(73) Assignee: DENSO CORPORATION, Kariya (JP)

( * ) Notice: Subject to any disclaimer, the term of this patent is extended or adjusted under 35 U.S.C. 154(b) by 308 days.

(21) Appl. No.: 16/080,202

(22) PCT Filed: Feb. 27, 2017

(86) PCT No.: PCT/JP2017/007541
§ 371 (c)(1),
(2) Date: Aug. 27, 2018

(87) PCT Pub. No.: WO2017/150465
PCT Pub. Date: Sep. 8, 2017

(65) Prior Publication Data
US 2019/0054919 A1 Feb. 21, 2019

(30) Foreign Application Priority Data
Feb. 29, 2016 (JP) .............................. JP2016-037550

(51) Int. Cl.
*B60W 30/12* (2020.01)
*G05D 1/00* (2006.01)
(Continued)

(52) U.S. Cl.
CPC ......... *B60W 30/12* (2013.01); *B62D 15/0265* (2013.01); *G05D 1/00* (2013.01);
(Continued)

(58) Field of Classification Search
CPC ......... B60W 30/12; G05D 1/00; B62D 15/02; G08G 1/16
See application file for complete search history.

(56) References Cited

U.S. PATENT DOCUMENTS 5,774,069 A 6/1998 Tanaka et al.
5,906,645 A * 5/1999 Kagawa .................... B60T 7/12
701/23

(Continued)

FOREIGN PATENT DOCUMENTS

JP H09-161196 A 6/1997
JP H09-222922 A 8/1997
(Continued)

OTHER PUBLICATIONS

International Search Report in PCT/JP2017/007541 dated May 16, 2017 in 2 pages.

*Primary Examiner* — Kira Nguyen
(74) *Attorney, Agent, or Firm* — Maschoff Brennan

(57) ABSTRACT

A driving mode switching device includes a determination section, a notification section, a detection section, and a control section. The determination section is configured to determine whether a state has occurred in which automatic driving needs to be terminated. The notification section is configured to notify a driver of the instruction for performing a switching operation as a predetermined operation of a vehicle in the case of determining, by the determination section, that the state has occurred in which the automatic driving needs to be terminated. The detection section is configured to detect the switching operation. The control section is configured to switch travelling from automatic driving to manual driving in the case of detecting the switching operation by the detection section.

9 Claims, 6 Drawing Sheets

(51) Int. Cl.
*G08G 1/16* (2006.01)
*B62D 15/02* (2006.01)

(52) U.S. Cl.
CPC ............. *G05D 1/0061* (2013.01); *G08G 1/16* (2013.01); *G08G 1/167* (2013.01); *B60W 2420/42* (2013.01)

(56) References Cited

U.S. PATENT DOCUMENTS

| | | | | |
|---|---|---|---|---|
| 8,250,482 | B2* | 8/2012 | Willekes | G06F 40/166 |
| | | | | 715/769 |
| 9,651,947 | B2* | 5/2017 | Kim | G05D 1/0088 |
| 10,579,055 | B2* | 3/2020 | Nagy | B60K 37/00 |
| 2009/0287367 | A1* | 11/2009 | Salinger | G05D 1/0246 |
| | | | | 701/23 |
| 2011/0071718 | A1* | 3/2011 | Norris | G05B 19/414 |
| | | | | 701/23 |
| 2012/0046817 | A1 | 2/2012 | Kindo et al. | |
| 2012/0078477 | A1* | 3/2012 | Takashiro | F16H 59/08 |
| | | | | 701/52 |
| 2014/0018993 | A1 | 1/2014 | Kindo et al. | |
| 2014/0088814 | A1 | 3/2014 | You et al. | |
| 2014/0156182 | A1* | 6/2014 | Nemec | B62D 1/28 |
| | | | | 701/430 |
| 2015/0192428 | A1 | 7/2015 | Nemec et al. | |
| 2015/0353088 | A1* | 12/2015 | Ishikawa | G05D 1/0061 |
| | | | | 701/23 |
| 2016/0033964 | A1 | 2/2016 | Sato et al. | |
| 2016/0041553 | A1* | 2/2016 | Sato | B60W 30/143 |
| | | | | 701/23 |
| 2016/0179092 | A1* | 6/2016 | Park | B60W 50/10 |
| | | | | 701/23 |
| 2016/0209840 | A1* | 7/2016 | Kim | G05D 1/0061 |
| 2016/0280235 | A1* | 9/2016 | Sugaiwa | G05D 1/0061 |
| 2016/0362113 | A1* | 12/2016 | Takaso | G05D 1/0255 |
| 2018/0113454 | A1* | 4/2018 | Emura | G05D 1/0061 |
| 2018/0281788 | A1* | 10/2018 | Uchida | B60W 50/00 |

FOREIGN PATENT DOCUMENTS

| | | |
|---|---|---|
| JP | 2000-276690 A | 10/2000 |
| JP | 2002-163799 A | 6/2002 |
| JP | 2006-137242 | 6/2006 |
| JP | 2008-137639 A | 6/2008 |
| JP | 2014-019301 A | 2/2014 |
| JP | 2014-065478 A | 4/2014 |
| WO | 2014/085121 A | 6/2014 |
| WO | 2016/013325 A | 1/2016 |

* cited by examiner

DRIVING MODE SWITCHING DEVICE

CROSS-REFERENCE TO RELATED APPLICATION

This application is a national stage application under 35 U.S.C. § 371(c) of PCT Application No. PCT/JP2017/007541, filed on Feb. 27, 2017, which claims priority to Japanese Patent Application No. 2016-37550, filed to the Japan Patent Office on Feb. 29, 2016, the entire contents of which are incorporated herein by reference.

TECHNICAL FIELD

The present disclosure relates to a driving mode switching device.

BACKGROUND ART

Various types of development have been made for techniques regarding automatic driving, automatically performing at least one of vehicle speed control or steering control.

For example, Patent Literature 1 describes the following emergency evacuation device. That is, the emergency evacuation device is configured to switch travelling by the manual driving of performing driving by a driver to travelling by the automatic driving of automatically performing vehicle speed control and steering control. Moreover, the emergency evacuation device is configured to support a subject vehicle for stopping the subject vehicle after moving the subject vehicle to a predetermined location.

CITATION LIST

Patent Literature

[PTL 1] JP 2014-19301 A

SUMMARY OF THE INVENTION

Contrary to switching from travelling by the manual driving to travelling by the automatic driving, it is assumed that switching from travelling by the automatic driving to travelling by the manual driving is performed in the case of determining that the subject vehicle is in a state in which the automatic driving needs to be terminated. Determination that the subject vehicle is in the state in which the automatic driving needs to be terminated as described herein is performed based on a subject vehicle surrounding state or a subject vehicle state detected by a sensor, for example. Note that the case of determining that the subject vehicle is in the state in which the automatic driving needs to be terminated may include, for example, the case of exceeding a control limit in the automatic driving, such as a sharp curve exceeding an assumed curvature. Further, such a case may include a case where the sensor cannot acquire information for performing the automatic driving, such as a case where a white line separating a traffic lane is blurred. As described above, the case of determining that the subject vehicle is in the state in which the automatic driving needs to be terminated includes not only a case according to road conditions at the periphery of the subject vehicle, but also a case according to the state of the subject vehicle itself, such as breakdown of the sensor provided at the subject vehicle.

The following problem has been found as a result of further study of the inventors: when switching from automatic driving to manual driving is, in the above-described case, performed by the subject vehicle regardless of whether the driver has permitted such switching, there is a probability that the driver cannot recognize switching.

One object of the present disclosure is to safely switch automatic driving by a subject vehicle to manual driving by a driver in the case of determining that the subject vehicle is in a state in which the automatic driving needs to be terminated.

One aspect of the present disclosure is a driving mode switching device used in a vehicle capable of performing automatic driving for automatically performing at least one of vehicle speed control or steering control and the manual driving of not executing the automatic driving. The driving mode switching device includes a determination section, a notification section, a detection section, and a control section. The determination section is configured to determine whether a state has occurred in which the automatic driving needs to be terminated. The notification section is configured to notify a driver of the instruction for performing a switching operation as a predetermined operation of the vehicle in the case of determining, by the determination section, that the state has occurred in which the automatic driving needs to be terminated. The detection section is configured to detect the switching operation. The control section is configured to switch from travelling by automatic driving to travelling by manual driving in the case of detecting the switching operation by the detection section.

According to such a configuration, the automatic driving is switched to the manual driving in a case where the subject vehicle detects the switching operation showing that the driver permits switching from the automatic driving to the manual driving, and therefore, switching from the automatic driving to the manual driving can be safely performed.

Note that each reference numeral in parentheses as described in the claims indicates a correspondence with specific means described in a later-described embodiment as one aspect, and is not intended to limit the technical scope of the present disclosure.

DESCRIPTION OF EMBODIMENTS

Hereinafter, exemplary embodiments of the present disclosure will be described with reference to the drawings.

1. First Embodiment

[1-1. Configuration]

Figure 1:
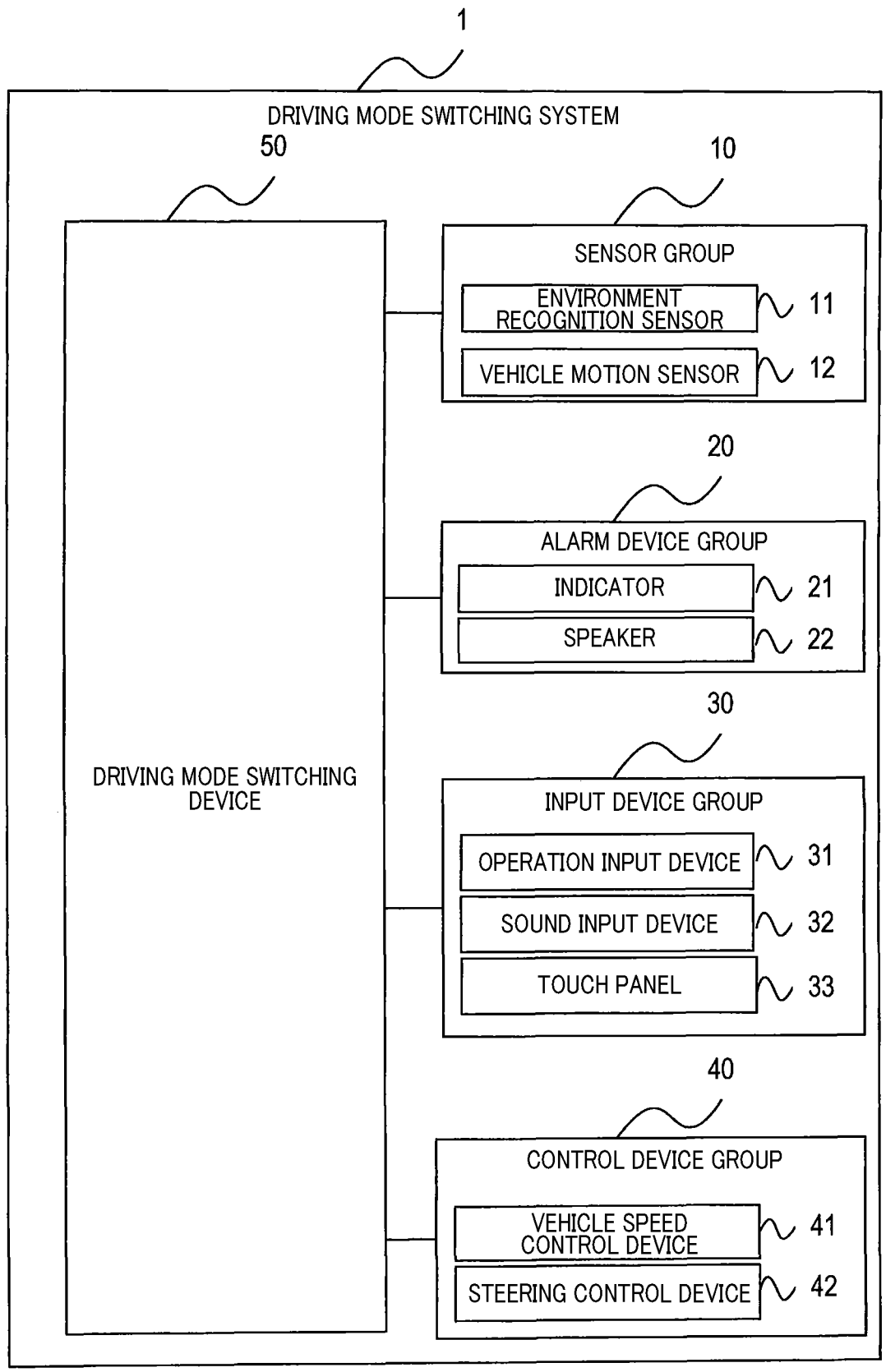
FIG. 1 is a block diagram of a configuration of a driving mode switching system of a first embodiment.

A driving mode switching system 1 illustrated in FIG. 1 is an in-vehicle system provided in a vehicle capable of travelling by automatic driving for automatically performing vehicle speed control and steering control and travelling by the manual driving of not executing the automatic driving.

The driving mode switching system 1 includes a sensor group 10, an alarm device group 20, an input device group 30, a control device group 40, and a driving mode switching device 50. Hereinafter, the vehicle on which the driving mode switching system 1 is mounted will be referred to as a "subject vehicle." Note that the vehicle speed control described herein indicates control of the speed of the subject vehicle. The vehicle speed control is control executable by an accelerator pedal and a brake pedal in manual driving. Moreover, the steering control is control of a travelling direction of the subject vehicle. The steering control is control executable by a steering wheel in manual driving.

The sensor group 10 includes an environment recognition sensor 11 and a vehicle motion sensor 12. The sensor group 10 outputs a recognition result to the driving mode switching device 50.

The environment recognition sensor 11 is a sensor configured to recognize environment around the subject vehicle. The environment recognition sensor 11 includes, for example, a camera configured to capture an image of the periphery of the subject vehicle and a radar configured to detect an object in front of the subject vehicle.

The vehicle motion sensor 12 is a sensor configured to recognize motion of the subject vehicle. The vehicle motion sensor 12 includes, for example, a speed sensor, an acceleration sensor, a gyroscope sensor, a yaw rate sensor, a roll rate sensor, and a pitch rate sensor.

The alarm device group 20 includes an indicator 21 and a speaker 22. The alarm device group 20 is configured to notify a driver of the subject vehicle according to the control of the driving mode switching device 50.

The indicator 21 is a display placed in a compartment of the subject vehicle to notify the driver of the subject vehicle by various indications. The indicator 21 includes, for example, a head-up display.

The speaker 22 is placed in the compartment of the subject vehicle. The speaker 22 is configured to notify the driver of the subject vehicle by sound.

The input device group 30 includes an operation input device 31, a sound input device 32, and a touch panel 33.

The operation input device 31 is used for driving operation by the driver of the subject vehicle. The operation input device 31 is placed in the compartment of the subject vehicle. The operation input device 31 includes, for example, the accelerator pedal, the brake pedal, and the steering wheel.

The sound input device 32 is placed in the compartment of the subject vehicle so that voice emitted from the driver of the subject vehicle for sound input can be detected. The sound input device 32 includes, for example, a microphone.

The touch panel 33 is placed in the compartment of the subject vehicle so that the driver of the subject vehicle can perform touch operation. For example, the touch panel 33 is placed on a screen of a car navigation system.

The control device group 40 includes a vehicle speed control device 41 and a steering control device 42. The control device group 40 is configured to control travelling of the subject vehicle according to the control from the driving mode switching device 50.

The vehicle speed control device 41 is configured to control driving and braking of the subject vehicle. Specifically, the vehicle speed control device 41 controls, during manual driving, driving and braking of the subject vehicle according to the input manipulation variable of the accelerator pedal and the brake pedal by the driver. On the other hand, during the automatic driving, the vehicle speed control device 41 controls driving and braking of the subject vehicle according to a control variable regarding driving and braking, the control variable being input from the driving mode switching device 50. That is, operation of the accelerator pedal and the brake pedal is not mechanically transmitted to an engine and a brake, but the technique of electrically detecting such operation to control driving and braking of the subject vehicle, such as a fuel injection amount and a brake pressure, is used. Thus, during the automatic driving, even when the driver operates the accelerator pedal and the brake pedal, such operation does not influence driving and braking of the subject vehicle.

The steering control device 42 is configured to control steering of the subject vehicle. Specifically, the steering control device 42 controls, during manual driving, steering of the subject vehicle according to the input manipulation variable of the steering wheel by the driver. On the other hand, during automatic driving, the steering control device 42 controls steering of the subject vehicle according to a control variable regarding steering, the control variable being input from the driving mode switching device 50. That is, operation of the steering wheel is not mechanically transmitted to an axle shaft of front wheels, but the technique of electrically detecting such operation to control steering of the subject vehicle, such as front wheel steering angle, i.e., a so-called "steer-by-wire technique," is used. Thus, during automatic driving, even when the driver operates the steering wheel, such operation does not influence steering of the subject vehicle.

The driving mode switching device 50 includes a microcomputer having, as components, a CPU, ROM, RAM, etc. The CPU is configured to execute later-described switching processing shown in FIG. 2 according to a program stored in the ROM.

The driving mode switching device 50 mainly includes a well-known microcomputer having a CPU and a semiconductor memory such as RAM, ROM, or a flash memory. Note that the semiconductor memory will be hereinafter merely referred to as a "memory." Various functions of the driving mode switching device 50 are implemented in such a manner that the CPU executes programs stored in a non-transitory tangible computer readable medium. Moreover, by execution of each program, a method corresponding to such a program is executed. Note that the number of microcomputers forming the driving mode switching device 50 may be one or more.

The driving mode switching device 50 is implemented in such a manner that the CPU executes the programs, but the above-described functions are not limited to those implemented using software. That is, some or all of elements of the driving mode switching device 50 may be implemented using hardware with a combination of a logic circuit, an analog circuit, etc.

[1-2. Processing]

Figure 2:
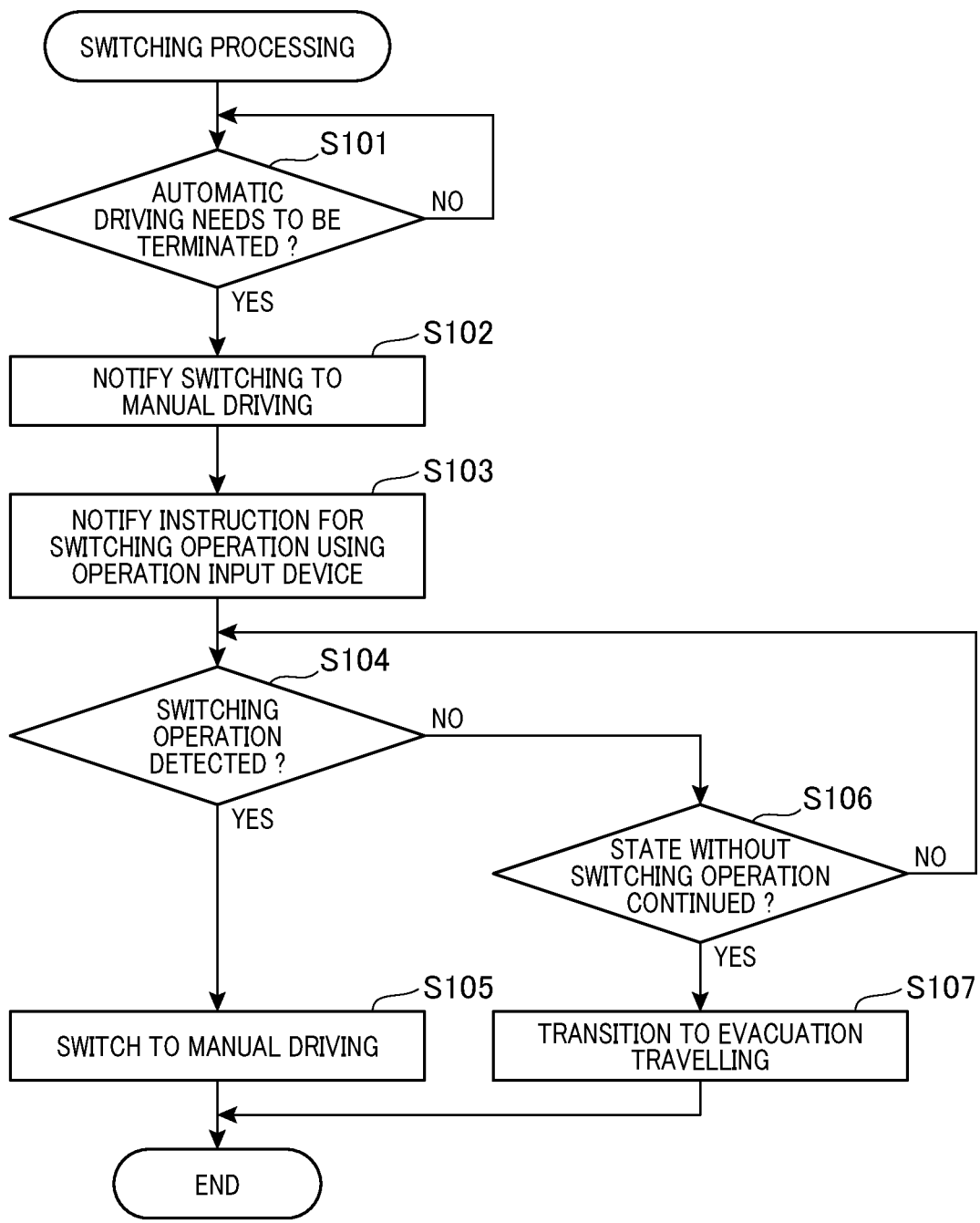
FIG. 2 is a flowchart of switching processing of the first embodiment.

Next, the switching processing executed by the driving mode switching device 50 will be described with reference to a flowchart of FIG. 2. The switching processing described herein is executed at the start of the automatic driving. Note that the automatic driving is performed by the vehicle speed control device 41 and the steering control device 42.

At S101, the driving mode switching device 50 determines whether a state has occurred in which the automatic driving of the subject vehicle needs to be terminated. From surrounding environment information obtained by the environment recognition sensor 11, such as road conditions, and subject vehicle motion information obtained by the vehicle motion sensor 12, the driving mode switching device 50 determines whether the automatic driving can be continued.

The driving mode switching device 50 repeats the processing of S101 until it is determined as the state in which the automatic driving needs to be terminated. A case where the state has occurred in which the automatic driving needs to be terminated as described herein includes, for example, the following cases:

a case where information necessary for travelling by automatic driving, such as information on a white line separating a traffic lane along the travelling direction, cannot be acquired from the camera as the environment recognition sensor 11;

a case where the information on the white line separating the traffic lane along the travelling direction is acquired from the camera as the environment recognition sensor 11, and it is determined as a sharp curve exceeding a limit allowed for travelling by automatic driving;

a case where undulation of a road for travelling is detected from the acceleration sensor as the vehicle motion sensor 12, and it is determined as undulation exceeding a limit allowed for travelling by automatic driving; and a case where at least one of the environment recognition sensor 11 or the vehicle motion sensor 12 is defective.

At S101, in a case where the driving mode switching device 50 determines as the state in which the automatic driving needs to be terminated, the driving mode switching device 50 terminates, at S102, the automatic driving to notify the driver of switching to the manual driving by means of the indicator 21 and the speaker 22. For example, a message of "Automatic driving will be terminated" is displayed on the indicator 21, and is delivered by the speaker 22.

At S103, the driving mode switching device 50 notifies the driver of the instruction for predetermined switching operation. The switching operation described herein is such operation that the driver shows, to the subject vehicle, permission of switching from the automatic driving to the manual driving. In the present embodiment, a predetermined switching operation pattern using the operation input device 31 is rotation of the steering wheel to right and left by 90 degrees. Notification includes, for example, an example where a message of "Please rotate steering wheel to right and left by 90 degrees" is displayed on the indicator 21 and is delivered by the speaker 22.

At S104, the driving mode switching device 50 detects whether the switching operation using the steering wheel and notified at S103 has been performing by the driver.

In a case where the switching operation using the steering wheel is detected at S104, the driving mode switching device 50 performs, at S105, the control of terminating the automatic driving performed by the vehicle speed control device 41 and the steering control device 42 to switch the automatic driving to the manual driving, and then, terminates the switching processing.

On the other hand, in a case where the switching operation using the steering wheel is not detected at S104, the driving mode switching device 50 determines, at S106, whether a certain time has elapsed from the time of first notification at S103 in a state in which the driver's switching operation is not detected. Until it is determined that the certain time has elapsed, the processing returns to S104, and subsequent processing is repeated. In a case where it is determined that the certain time has elapsed, transition to evacuation travelling is made at S107, and the switching processing is terminated. The evacuation travelling described herein is travelling by the automatic driving for evacuating the subject vehicle to a safe location such as the side of the road by means of the sensor group 10 provided at the subject vehicle.

[1-3. Advantageous Effects]

According to the embodiment described in detail above, the following advantageous effects are provided.

(1a) In the present embodiment, when it is determined as the state has occurred in which automatic driving needs to be terminated, the driving mode switching device 50 notifies the driver of termination of automatic driving, and then, notifies the driver of the instruction for the switching operation showing permission of switching to manual driving after termination of automatic driving. Thereafter, the driving mode switching device 50 switches the automatic driving to manual driving after having detected that the driver had performed the switching operation. Thus, it is possible to reduce switching from being performed in a state that the driver does not recognize switching for driving mode, and switching to manual driving can be safely performed.

(1b) In the present embodiment, the driving mode switching device 50 notifies the driver of the instruction for performing operation using the steering wheel as the switching operation, and detects the switching operation performed by the driver having received notification. Thus, the driver performs such switching operation so that a state in which prompt transition to manual driving is allowed by the driver can be more clearly shown. Moreover, the driver does not need to perform unnecessary driving operation for the switching operation. Thus, when automatic driving is switched to manual driving, the driver can smoothly transition to travelling by manual driving. Further, the driver can perform the switching operation without directing attention to an operation other than operation necessary for the driving operation. As a result, switching to manual driving can be safely performed.

(1c) The steering control device 42 of the present embodiment is configured such that operation using the steering wheel does not influence the automatic driving. With such a configuration, the steering control device 42 allows the subject vehicle to travel by the automatic driving without influence on operation of the subject vehicle even in a case where the driver performs an operation using the steering wheel during automatic driving.

2. Second Embodiment

[2-1. Configuration]

A basic configuration in a second embodiment is similar to that of the first embodiment. Thus, common configurations will not be described, and differences will be mainly described. Note that the same reference numerals as those of the first embodiment are used to represent the same configurations, and description above will be referred to.

Figure 3:
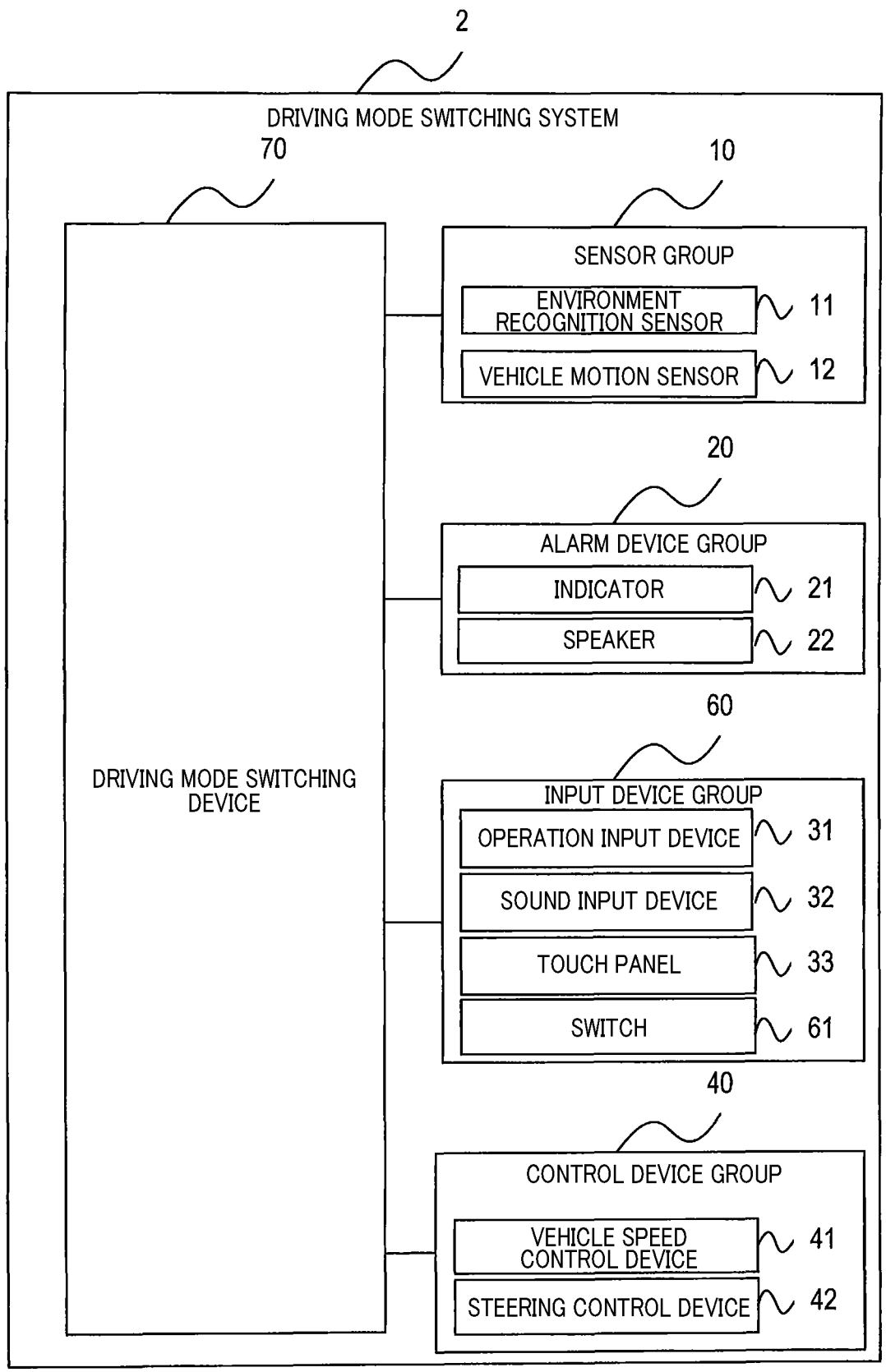
FIG. 3 is a block diagram of a configuration of a driving mode switching system of a second embodiment.

Of configurations of a driving mode switching system 2 of the second embodiment, a sensor group 10, an alarm device group 20, and a control device group 40 are the same as those of the driving mode switching system 1 of the first embodiment as illustrated in FIG. 3. On the other hand, an input device group 60 and a driving mode switching device 70 provided at the driving mode switching system 2 of the second embodiment are different from the input device group 30 and the driving mode switching device 50 provided at the driving mode switching system 1. Specifically, the input device group 60 of the second embodiment includes an operation input device 31, a sound input device 32, a touch panel 33, and a switching input device (switch) 61. That is, the input device group 60 of the second embodiment is different from the input device group 30 of the first embodiment in that the switching input device 61 is further provided.

Figure 4:
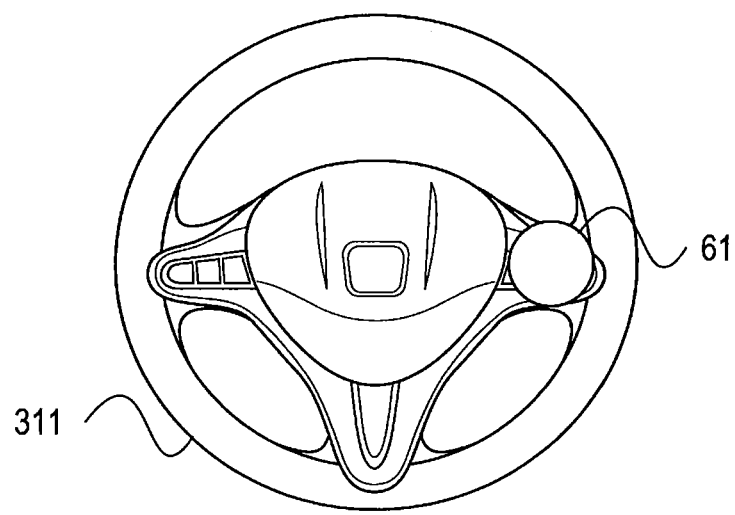
FIG. 4 is a view of a switch of the second embodiment.

The switching input device 61 is a switch dedicated for performing switching operations, and a driver can perform a switching operation by pressing the switch. In this example, the switch is placed on a steering wheel 311 as illustrated in FIG. 4.

The driving mode switching device 70 of the second embodiment has the same hardware configuration as that of the driving mode switching device 50 of the first embodiment, but is different from the driving mode switching device 50 in the switching processing to be executed.

[2-2. Processing]

Figure 5:
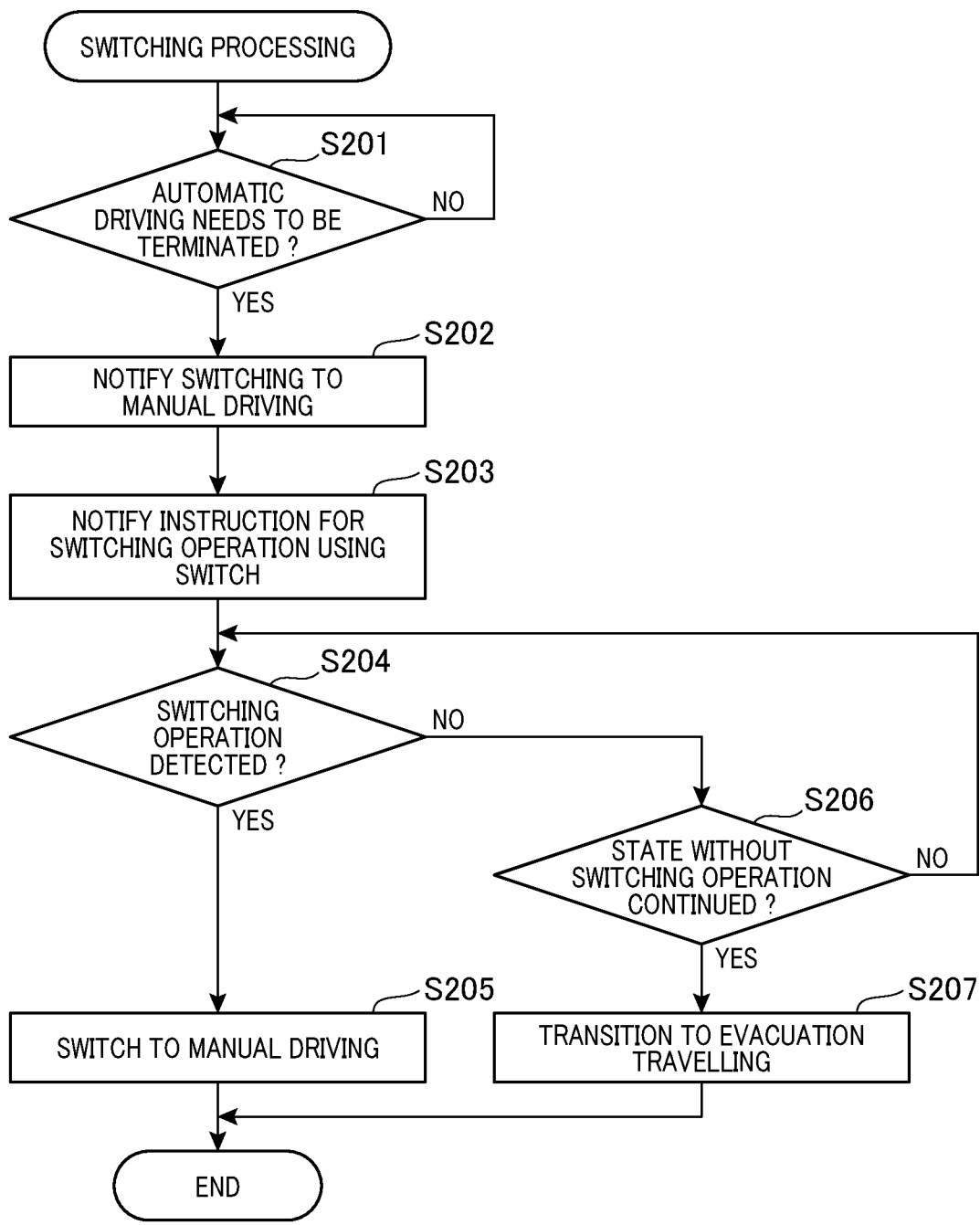
FIG. 5 is a flowchart of switching processing of the second embodiment.

Next, the switching processing executed by the driving mode switching device 70 will be described with reference to a flowchart of FIG. 5. S201 to S202, S205, and S207 of the switching processing of the second embodiment executed by the driving mode switching device 70 are the same as S101 to S102, S105, and S107 of the switching processing of the first embodiment. Thus, only S203, S204, and S206 as differences between the first embodiment and the second embodiment will be described below.

At S203, the driving mode switching device 70 notifies the driver of the instruction for performing the predetermined switching operation using the switch. In the present embodiment, the predetermined operation is pressing of the switch. For example, a notification method includes a method in which a message of "please turn the switch on" is displayed on an indicator 21 and is delivered by a speaker 22.

At S204, the driving mode switching device 70 detects whether the switching operation using the switch and notified at S203 has been performed by the driver.

In a case where the driving mode switching device 70 detects the switching operation using the switch at S204, the processing proceeds to S205.

At S205, the driving mode switching device 70 terminates automatic driving performed by a vehicle speed control device 41 and a steering control device 42. Then, the driving mode switching device 70 performs the control of switching from automatic driving to manual driving. Thereafter, the driving mode switching device 70 terminates the switching processing.

On the other hand, in a case where the driving mode switching device 70 does not detect the switching operation using the switch at S204, the processing proceeds to S206.

At S206, the driving mode switching device 70 determines whether a certain time has elapsed from the time of first notification at S203 in a state in which the driver's switching operation is not detected. That is, the switching processing of the second embodiment is basically similar to the switching processing of the first embodiment. There is the following difference: the switching operation is performed using the operation input device 31 in the first embodiment, whereas the switching operation is performed using the switch in the second embodiment.

[2-3. Advantageous Effects]

According to the second embodiment described in detail above, the following advantageous effects are provided in addition to the above-described advantageous effect (1a) of the first embodiment.

In the present embodiment, operation necessary for driving and the switching operation are clearly distinguished from each other by use of the switch for the switching operation. With this configuration, the driver can clearly recognize that the switching operation has been performed.

3. Other Embodiments (3a) In the above-described first embodiment, the switching operation using the operation input device 31 is the operation of rotating the steering wheel 311 to right and left by 90 degrees, but the switching operation pattern using the steering wheel 311 is not limited to above. That is, the switching operation may be the operation of rotating the steering wheel 311 such that each of steering wheel rotation angle, rotation speed, and rotation angle acceleration reaches a predetermined value as any of a positive value, a negative value, and zero, for example. The predetermined value described herein may be such a value that one of the directions of rotating the steering wheel 311 is positive and the other direction is negative. Alternatively, the switching operation may be an operation combination of one or more patterns such as the operation of slowly rotating the steering wheel 311 to right by 90 degrees, the operation of quickly rotating the steering wheel 311 to left by 45 degrees, the operation of rotating the steering wheel 311 to right and left little by little, and the operation of holding the steering wheel 311 at a center position. The switching operation using the operation input device 31 is not limited to operation using the steering wheel 311. For example, the switching operation may be the operation of stepping on the accelerator pedal or the brake pedal multiple times or the operation of moving a shift lever. In this case, an advantageous effect similar to the above-described advantageous effect (1b) of the first embodiment is provided.

Figure 6:
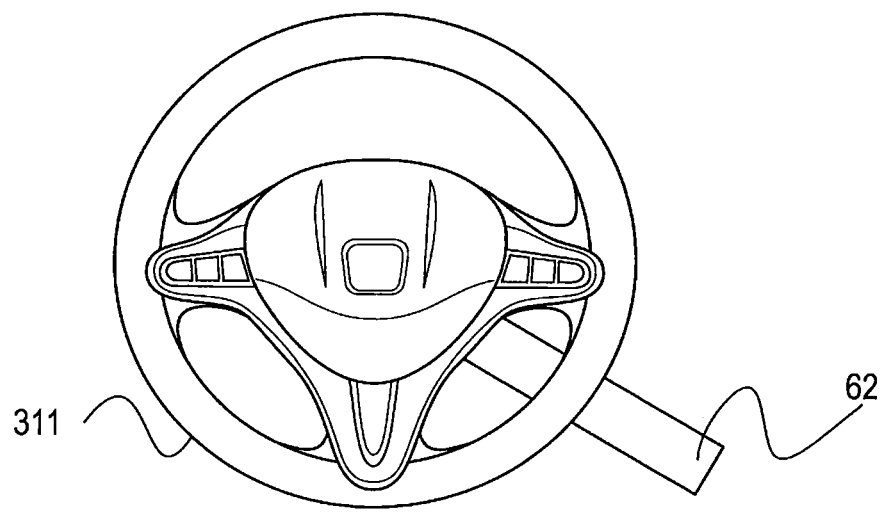
FIG. 6 is a view of a lever of another embodiments.
Figure 7:
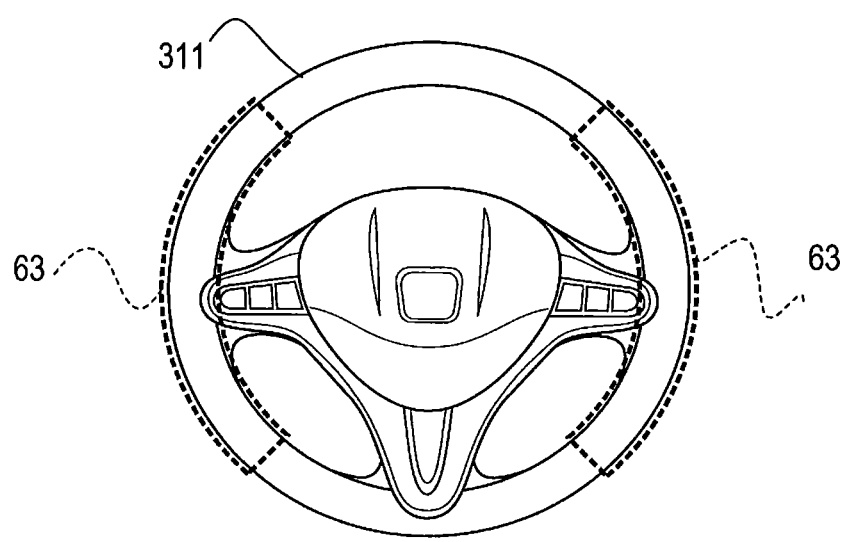
FIG. 7 is a view of a pressure sensor of another embodiments.

(3b) In the above-described second embodiment, the dedicated switching input device 61 is the pressable switch, but is not limited to above. For example, the switching input device may be a lever 62 dedicated for the switching operation as illustrated in FIG. 6, the lever 62 being provided in the subject vehicle. Alternatively, the switching input device may be a sensor configured to detect that the driving operation of the driver has been prepared. For example, the switching input device may be a pressure sensor 63 provided at the steering wheel illustrated in FIG. 7. In this case, the switching input device may be configured to detect the driver's operation of holding the steering wheel as preparation for the driving operation of the driver.

(3c) In the above-described second embodiment, the position of the switching input device 61 is on the steering wheel 311, but is not limited to above. For example, the installation position of the switching input device may be within an area operable by the driver during manual driving, such as a ceiling of the subject vehicle or the shift lever. The subject vehicle is, before the switching operation, in a state in which the subject vehicle travels by automatic driving, and therefore, the switching input device may be placed outside the area operable by the driver during manual driving.

(3d) In the above-described embodiments, the indicator 21 is the head-up display, but the present disclosure is not limited to above. For example, the indicator may be the screen of the car navigation system or a display section of a meter. Particularly in the configuration with the dedicated switching input device as in the second embodiment, the indicator may be integrated with the switching input device. Specifically, it is configured such that the switch as the switching input device and a LED indicator as the indicator are integrated, for example. With such a configuration of the switching input device and the indicator, light emission from the LED indicator causes the driver to visually recognize it as if the switch itself emits light. This allows the driver to intuitively recognize the requested switching operation, and therefore, the driver can more accurately and quickly perform the switching operation. Further, in the case of providing multiple indicators such as the head-up display and the LED indicator described so far as examples, notification by the indicators is performed using these components at the same time. Specifically, the head-up display may notify the driver of the instruction for performing the switching operation by the switching input device while the indicator integrated with the switching input device is emitting light.

(3e) The operation input device 31 has been described an example of a switching operation input target in the above-described first embodiment, and the switching input device 61 has been described as an example of the switching operation input target in the second embodiment. However, the input device group as the switching operation input target is not limited to above. The input device group as the switching operation input target may be, for example, the sound input device 32 or the touch panel 33 described as an example in the above-described embodiments.

The switching processing in the case of using the sound input device 32 is basically similar to the switching processing of the first embodiment shown in FIG. 2, but is different in the following points. That is, in the first embodiment, the driving mode switching device 50 notifies, at S103, that the switching operation is to be performed using the operation input device 31, and determines, at S104, whether the switching operation using the operation input device 31 has been detected. Moreover, in the first embodiment, the driving mode switching device 50 determines, at S106, whether a state in which the switching operation using the operation input device 31 is not detected has been continued for a certain time. Instead, in the case of performing the switching operation using the sound input device 32, the driving mode switching device notifies, at a step corresponding to S103, that the switching operation is performed using the sound input device 32. Specifically, the driving mode switching device notifies the driver of the instruction for emitting words such as "driving is available" to the microphone as the sound input device 32. At a step corresponding to S104, the driving mode switching device determines whether the switching operation using the sound input device 32 has been detected. Then, at a step corresponding to S106, the driving mode switching device determines whether a state in which the switching operation using the sound input device 32 is not detected has been continued for a certain time. That is, there is the following difference: the switching operation is performed using the operation input device 31 in the first embodiment, whereas in this embodiment the switching operation is performed using the sound input device 32.

The switching processing in the case of using the touch panel 33 is basically similar to the switching processing of the first embodiment illustrated in FIG. 2, but is different in the following points. That is, instead of the above-described processing of the first embodiment, in the case of performing the switching operation using the touch panel 33, the driving mode switching device notifies, at the step corresponding to S103, that the switching operation is to be performed using the touch panel 33. Specifically, the driving mode switching device notifies the driver of the instruction for performing operation such as pressing of a button displayed on the touch panel 33 or tracing of a slide section with a finger. At the step corresponding to S104, the driving mode switching device determines whether the switching operation using the touch panel 33 has been detected. Then, at the step corresponding to S106, the driving mode switching device determines whether a state in which the switching operation using the touch panel 33 is not detected has been continued for a certain time. That is, there is the following difference: the switching operation is performed using the operation input device 31 in the first embodiment, whereas in this embodiment the switching operation is performed using the touch panel 33.

(3f) In the above-described embodiments, the notified switching operation is of a single predetermined type, but the type of notified switching operation is not limited to the single type. For example, notification may be made such that multiple types of switching operation are to be performed, and in the case of detecting all of the multiple types of switching operation, the automatic driving may be switched to the manual driving. Alternatively, regarding the type of switching operation requested for the driver, the driving mode switching device may randomly select a different type of switching operation for every switching processing, for example. Specifically, the switching operation is, in some cases, the operation of rotating the steering wheel 311 to right and left by 90 degrees, and in other cases, may be the operation of stepping on the brake pedal multiple times. In this case, a different type of switching operation is randomly requested for every switching processing so that habituation of the switching operation of the driver can be prevented and unthinking execution of the switching operation can be prevented.

(3g) The above-described embodiments are based on an assumption that the automatic driving is performed by both of the vehicle speed control device 41 and the steering control device 42, but the automatic driving is not limited to execution by both components. For example, the automatic driving may be the automatic driving of automatically performing control of either one of the vehicle speed control device 41 or the steering control device 42.

(3h) In the above-described embodiments, the steer-by-wire technique is used for the steering control device 42. By this technique, steering of the subject vehicle does not influence even when the driver operates the steering wheel 311 during the automatic driving. Such a technique is not limited to steer-by-wire. For example, a VGRS technique may be used. VGRS described herein stands for and indicates variable gear ratio steering. By VGRS, it is set such that a gear ratio decreases in response to operation of the steering wheel 311 during automatic driving. Thus, even when the driver operates the steering wheel 311, influence of such operation on steering of the subject vehicle can be reduced. Alternatively, the steering wheel 311 is rotated using electric power steering, and rotation force or braking force is applied to one of the right and left wheels such that vehicle body moment is generated in a direction opposite to rotation of the steering wheel 311. In this manner, influence of such operation on steering of the subject vehicle can be also reduced. As another alternative, generally-known methods described in general literatures may be used.

(3i) In the above-described embodiments, the environment recognition sensor 11 is the camera configured to capture the image of the periphery of the subject vehicle, the radar configured to detect the object in front of the subject vehicle, etc., but the environment recognition sensor 11 is not limited to above. For example, the environment recognition sensor 11 may be a GPS receiver configured to receive, via a GPS antenna, a radio wave transmitted from a GPS artificial satellite. Note that in this case, the driving mode switching device acquires, in advance, information on a position range allowing the automatic driving, such as a preset section of a freeway. Then, based on such acquired information and the absolute position of the subject vehicle acquired from the radio wave received by the GPS receiver, the driving mode switching device determines whether the subject vehicle is within the above-described position range allowing the automatic driving. Determination on whether the automatic driving can be continued may be performed by such determination. That is, in a case where the subject vehicle is within the above-described set range allowing the automatic driving, it may be determined that the automatic driving can be continued. When the subject vehicle deviates from the range allowing the automatic driving, it may be determined that the automatic driving cannot be continued.

(3j) In the above-described embodiments, the driving mode switching device 50, 70 performs, based on the information obtained from both of the environment recognition sensor 11 and the vehicle motion sensor 12, the processing of determining whether the subject vehicle is in the state in which the automatic driving needs to be terminated. However, an information acquisition source is not limited to both of the environment recognition sensor 11 and the vehicle motion sensor 12. For example, the processing of determining whether the subject vehicle is in the state in which the automatic driving needs to be terminated may be performed based on the information obtained from either one of the environment recognition sensor 11 or the vehicle motion sensor 12. Alternatively, such processing may be based on information obtained from other components than the environment recognition sensor 11 and the vehicle motion sensor 12.

(3k) In the above-described embodiments, the driving mode switching device 50, 70 notifies the driver of the subject vehicle by means of both of the indicator 21 and the speaker 22, but notification is not necessarily made using both components. For example, notification may be made using only either one of the indicator 21 or the speaker 22. Alternatively, notification may be made using other components than the indicator 21 and the speaker 22.

(3l) The present disclosure can be implemented not only in the form of the above-described driving mode switching device 50, 70, but also in various forms such as the driving mode switching system 1, 2 including the driving mode switching device 50, 70 as a component, a program for causing a computer to function as the driving mode switching device 50, 70, a non-transitory tangible computer readable medium storing the program, such as a semiconductor memory, and a driving mode switching method.

(3m) In the above-described embodiments, some or all of the functions executed by the driving mode switching device 50, 70 may be configured as hardware by one or more ICs, for example.

(3n) Multiple functions of a single component in the above-described embodiments may be implemented by multiple components, or a single function of a single component may be implemented by multiple components. Moreover, multiple functions of multiple components may be implemented by a single component, or a single function implemented by multiple components may be implemented by a single component. Further, some of the configurations of the above-described embodiments may be omitted. In addition, at least some of the configurations of the above-described embodiments may be added to or replaced with other configurations of the above-described embodiments. Note that any aspects included in a technical idea specified only by wording used in the claims are embodiment of the present disclosure.

The invention claimed is:

1. A driving mode switching device used in a vehicle capable of performing automatic driving for automatically performing at least one of vehicle speed control and steering control, and manual driving in which the automatic driving is not executed, comprising:

a determination section configured to determine whether a state has occurred in which the automatic driving needs to be terminated;

a notification section configured to notify a driver of an instruction for performing a switching operation that is a predetermined operation of the vehicle in a case of determining, by the determination section, that the state has occurred in which the automatic driving needs to be terminated;

a detection section configured to detect the switching operation; and a control section configured to switch from travelling by the automatic driving to travelling by the manual driving in the case of detecting the switching operation by the detection section, wherein:

the control section determines whether a certain time has elapsed from a time of notifying the driver of the instruction for the switching operation in a state in which the switching operation of the driver is not detected, and performs an automatic driving for evacuating the vehicle to a safe location in response to determining that the certain time has elapsed;

the notification section requests the driver that multi ole types of the switching operation are to be preformed, and the control section switches from travelling by the automatic driving to travelling by the manual driving in response to detecting ail of the multiple types of the requested switching operation.

2. The driving mode switching device according to claim 1, wherein
the switching operation includes operation of an operation input device used for driving operation by the driver.

3. The driving mode switching device according to claim wherein
the switching operation includes operation of at least one of an accelerator pedal, a brake pedal, a steering wheel, or a shift lever as the operation input device.

4. The driving mode switching device according to claim 1, wherein
the switching operation includes operation of stepping on at least one of an accelerator pedal or a brake pedal multiple times.

5. The driving mode switching device according to claim 1, wherein
the switching operation includes operation of rotating a steering wheel of the vehicle in a predetermined pattern.

6. The driving mode switching device according to claim 1, wherein
a sound input device to which voice of the driver is input is mounted in a compartment of the vehicle, and
the switching operation includes sound input to the sound input device.

7. The driving mode switching device according to claim 1, wherein
a touch panel for input of touch operation is placed in a compartment of the vehicle, and
the switching operation includes operation for the touch panel.

8. The driving mode switching device according to claim 1, wherein
a switching input device for input of the switching operation is mounted in a compartment of the vehicle, and
the switching operation includes operation of the switching input device.

9. The driving mode switching device according to claim 1, wherein
the notification section notifies the switching operation as an operation randomly selected from the multiple types of switching operation.

\* \* \* \* \*